United States Patent
Huang et al.

(10) Patent No.: US 7,823,934 B2
(45) Date of Patent: Nov. 2, 2010

(54) FIXING APPARATUS OF DATA STORAGE DEVICE

(75) Inventors: Ri-Dong Huang, Shenzhen (CN); Hsuan-Tsung Chen, Tu-Cheng (TW); Guang-Yao Lee, Taipei Hsien (TW); Chun-Chi Liang, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1092 days.

(21) Appl. No.: 11/309,633

(22) Filed: Sep. 1, 2006

(65) Prior Publication Data

US 2007/0145866 A1    Jun. 28, 2007

(30) Foreign Application Priority Data

Dec. 28, 2005   (CN) .................... 2005 2 0121443 U

(51) Int. Cl.
*E05C 19/00*    (2006.01)
*A47B 81/00*    (2006.01)

(52) U.S. Cl. ........................... 292/143; 292/1; 292/150; 292/161; 292/DIG. 11; 312/223.1; 312/223.2; 248/27.1

(58) Field of Classification Search .............. 292/1, 292/143, 150, 161, DIG. 11; 312/223.1, 312/223.2; 248/27.1, 27.3; 361/747
See application file for complete search history.

(56) References Cited

U.S. PATENT DOCUMENTS

| | | | | |
|---|---|---|---|---|
| 280,987 | A * | 7/1883 | Wolfrath | 292/161 |
| 1,955,969 | A * | 4/1934 | Marzolf | 403/107 |
| 2,874,986 | A * | 2/1959 | Henrichs | 292/167 |
| 4,376,522 | A * | 3/1983 | Banks | 248/503.1 |
| 4,428,608 | A * | 1/1984 | Cooke et al. | 292/247 |
| 4,826,221 | A * | 5/1989 | Harmon | 292/167 |
| 4,828,299 | A * | 5/1989 | Poe | 292/139 |
| 5,593,244 | A * | 1/1997 | Ruckert | 403/322.4 |
| 6,654,240 | B1 | 11/2003 | Tseng et al. | |
| 6,728,109 | B1 * | 4/2004 | Wu | 361/747 |
| 7,611,100 | B2 * | 11/2009 | Peng et al. | 248/27.1 |
| 7,656,654 | B2 * | 2/2010 | Liu et al. | 361/679.33 |
| 2007/0164170 | A1 * | 7/2007 | Huang et al. | 248/27.1 |
| 2007/0267951 | A1 * | 11/2007 | Lin | 312/223.1 |

* cited by examiner

*Primary Examiner*—Carlos Lugo
(74) *Attorney, Agent, or Firm*—Wei Te Chung

(57) ABSTRACT

An exemplary fixing apparatus is provided for holding a data storage device defining a pair of holes in a sidewall thereof. The fixing apparatus includes a bracket, a sliding member, a rotating member, a pair of latch members, and a resilient member. The bracket includes a side panel defining a pair through holes therein. The sliding member is slidably attached to the side panel. The rotating member is rotatably attached to the sliding member. The resilient member is disposed between the sliding member and the rotating member. The latch members are pivotably attached to the rotating member and movably extend through the through hole of the bracket to engage in the holes of the data storage device.

17 Claims, 5 Drawing Sheets

FIXING APPARATUS OF DATA STORAGE DEVICE

FIELD OF THE INVENTION

The present invention relates to fixing apparatuses of data storage devices, and particularly to a fixing apparatus which readily mounts a data storage device in a bracket.

DESCRIPTION OF RELATED ART

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. However, fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

What is desired, therefore, is to provide a fixing apparatus which readily attaches a data storage device in a drive bracket.

SUMMARY OF THE INVENTION

In one preferred embodiment, a fixing apparatus is provided for holding a data storage device defining a pair of holes in a sidewall thereof. The fixing apparatus includes a bracket, a sliding member, a rotating member, a pair of latch members, and a resilient member. The bracket includes a side panel defining a pair through holes therein. The sliding member is slidably attached to the side panel. The rotating member is rotatably attached to the sliding member. The resilient member is disposed between the sliding member and the rotating member. The latch members are pivotably attached to the rotating member and movably extend through the through hole of the bracket to engage in the holes of the data storage device.

Other advantages and novel features will become more apparent from the following detailed description of preferred embodiments when taken in conjunction with the accompanying drafting, in which:

BRIEF DESCRIPTION OF THE DRAFLANGES

DETAILED DESCRIPTION OF THE INVENTION

Figure 1:
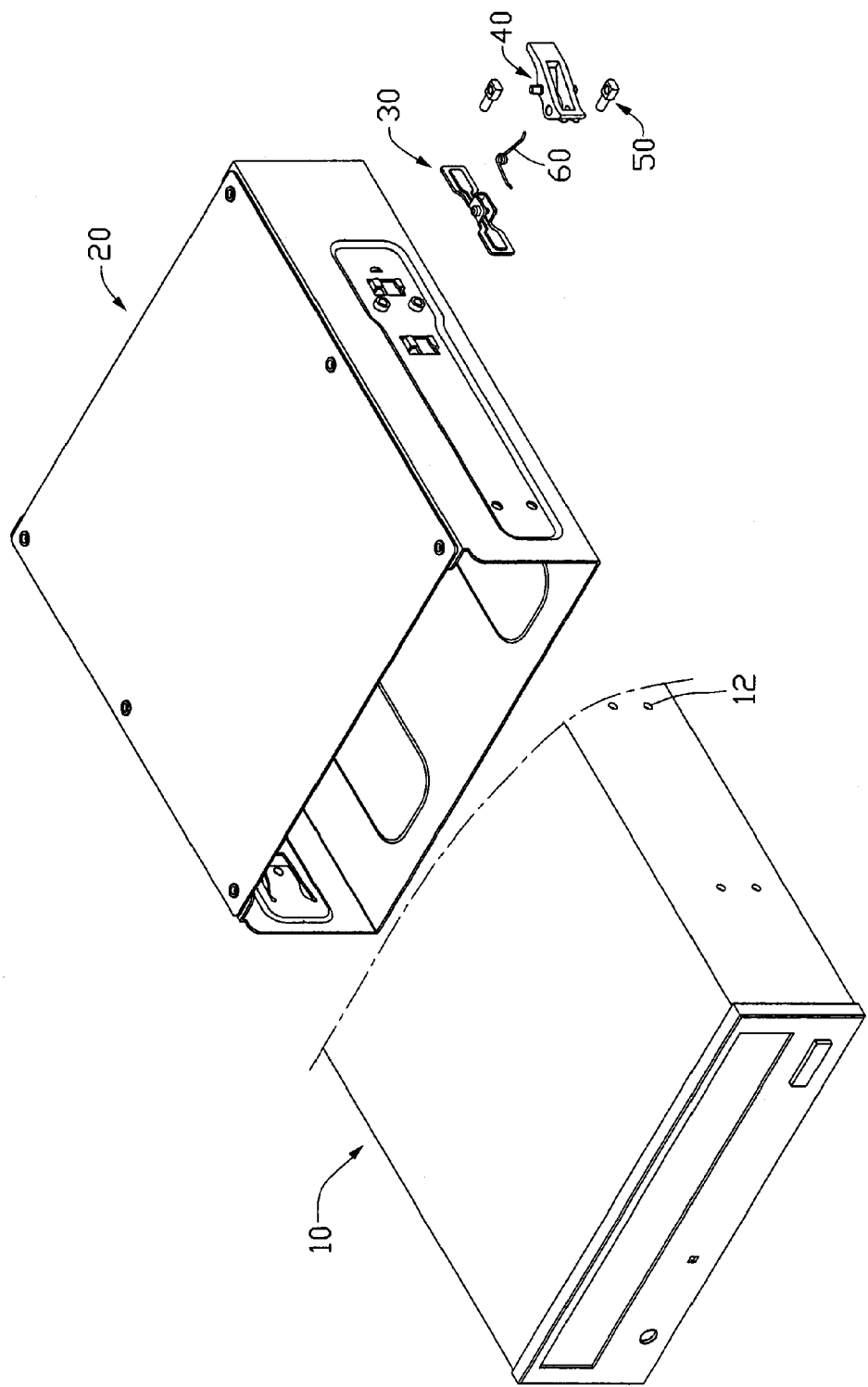
FIG. 1 is an exploded, isometric view of a fixing apparatus in accordance with a preferred embodiment of the present invention, together with a data storage device, the fixing apparatus including a rotating member.

Referring to FIG. 1, a fixing apparatus in accordance with a preferred embodiment of the present invention is provided to attach a data storage device 10 to an electronic device (not shown) such as a computer. The fixing apparatus includes a bracket 20 for receiving the data storage device 10, a sliding member 30, a rotating member 40, a pair of latch members 50, and a resilient member 60. A pair of holes 12 is defined in a sidewall of the data storage device 10.

Figure 2:
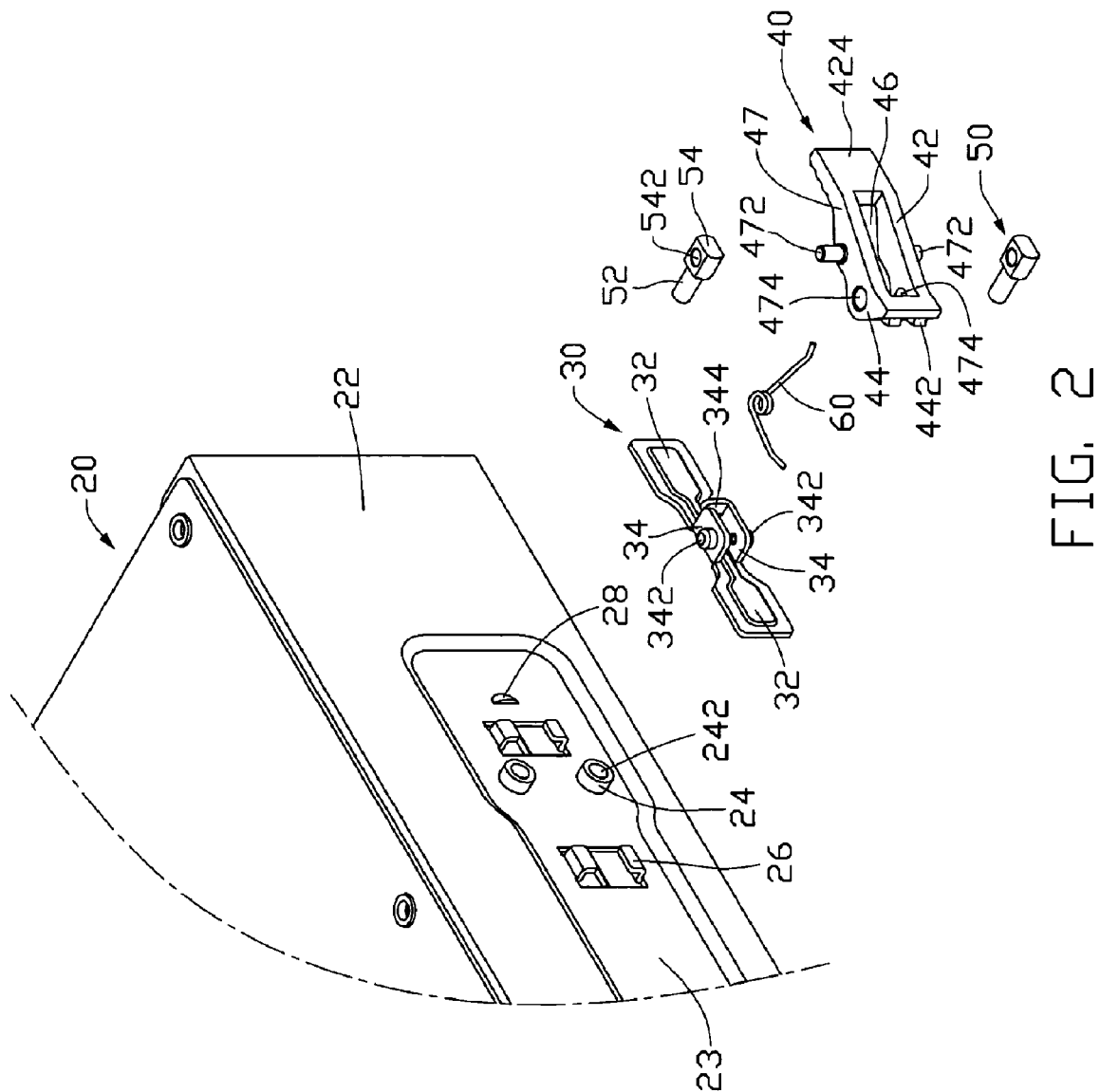
FIG. 2 is an enlarged view of a part of FIG. 1.

Referring also to FIG. 2, the bracket 20 includes a side panel 22. The side panel 22 includes a recessed portioned portion 23. A pair of posts 24 perpendicularly extends outward from the recessed portion 23. Each of the posts 24 defines a through hole 242 therein, corresponding to the holes 12 of the data storage device 10 respectively. Two pairs of spaced hooks 26 extend from the recessed portion 23 outward adjacent the posts 24. Each pair of the hooks 26 is arranged face to face, cooperatively defining a sliding railway. A blocking protrusion 28 extends outward from the recessed portion 23 adjacent a right side of one of the pair of hooks 26 nearest a rear of the side panel 22.

The sliding member 30 includes a pair of wings 32 in alignment with each other, and a pair of spaced plates 34 extending perpendicularly in parallel from a middle portion of the wings 32. A pair of short shafts 342 extends outwardly from outer surfaces of the plates 34, respectively. A fixing tab 344 extends perpendicularly from a right edge of a lower plate 34, for fixing the resilient member 60 therearound.

Figure 3:
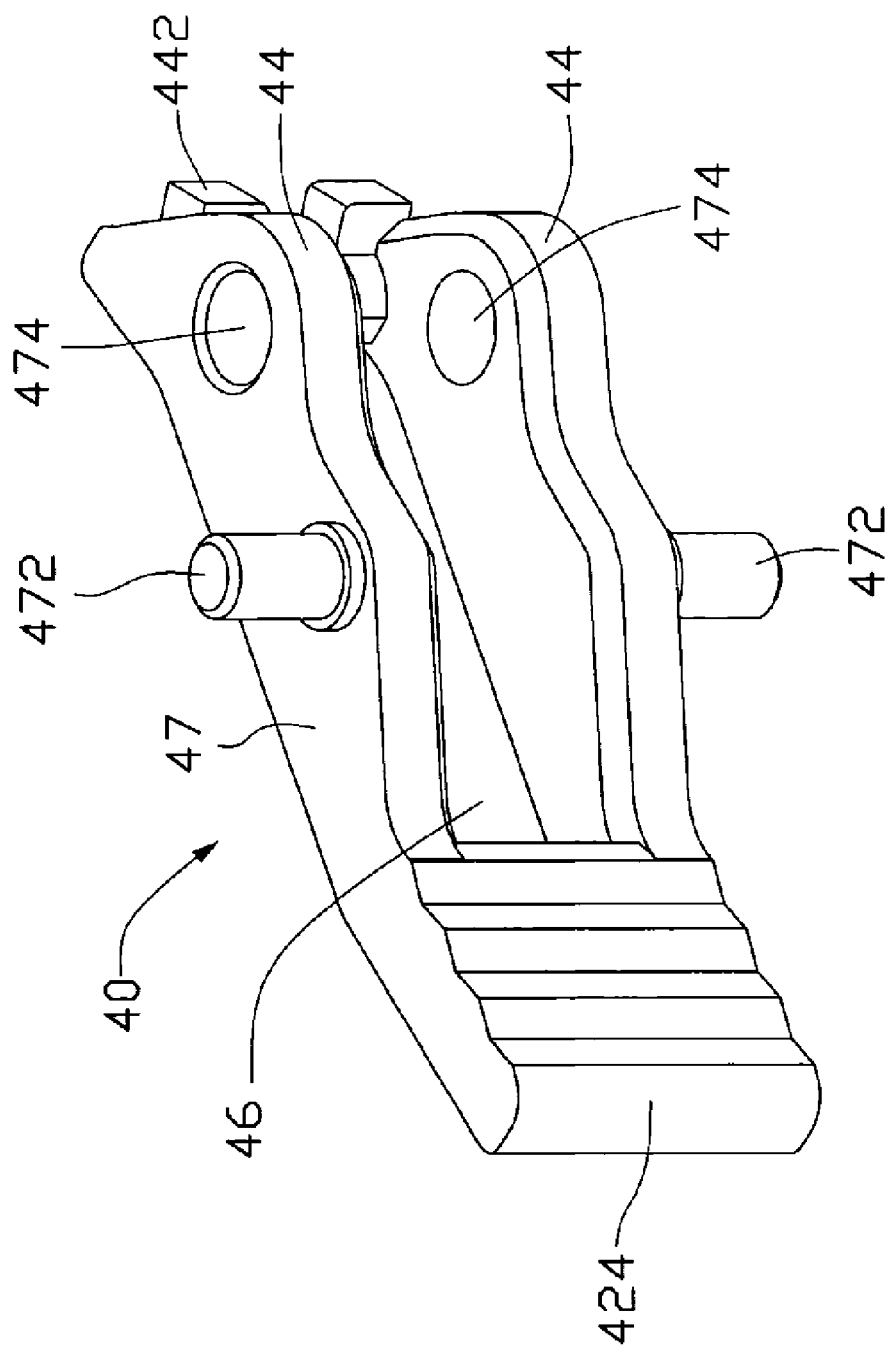
FIG. 3 is an enlarged, isometric view of the rotating member of FIG. 1, but viewed from another aspect.

Referring also to FIG. 3, the rotating member 40 includes a base wall 42, and a pair of flanges 47 extending perpendicularly from the base wall 42. Each of the flanges 47 generally has a triangular configuration and includes an actuating end 44. Two poles 472 extend perpendicularly from outer surfaces of the flanges 47 respectively. Two pivoting holes 474 are defined in the flanges 47 respectively adjacent the poles 472, for receiving the shafts 342 of the rotating member 40 therein. A slot 46 is defined in the base wall 42. A handgrip portion 424 and a pair of positioning blocks 442 are separately formed at two opposite ends of the base wall 42.

Each of the latch members 50 includes a block 54, and a rod 52. The rod 52 extends from the block 54, for movably extending through the through hole 242 of the corresponding post 24 of the bracket 20 to engage in the corresponding hole 12 of the data storage device 10. The block 54 defines a pivoting hole 542 therein, for pivotably engaging with the corresponding pole 472 of the rotating member 40.

Figure 4:
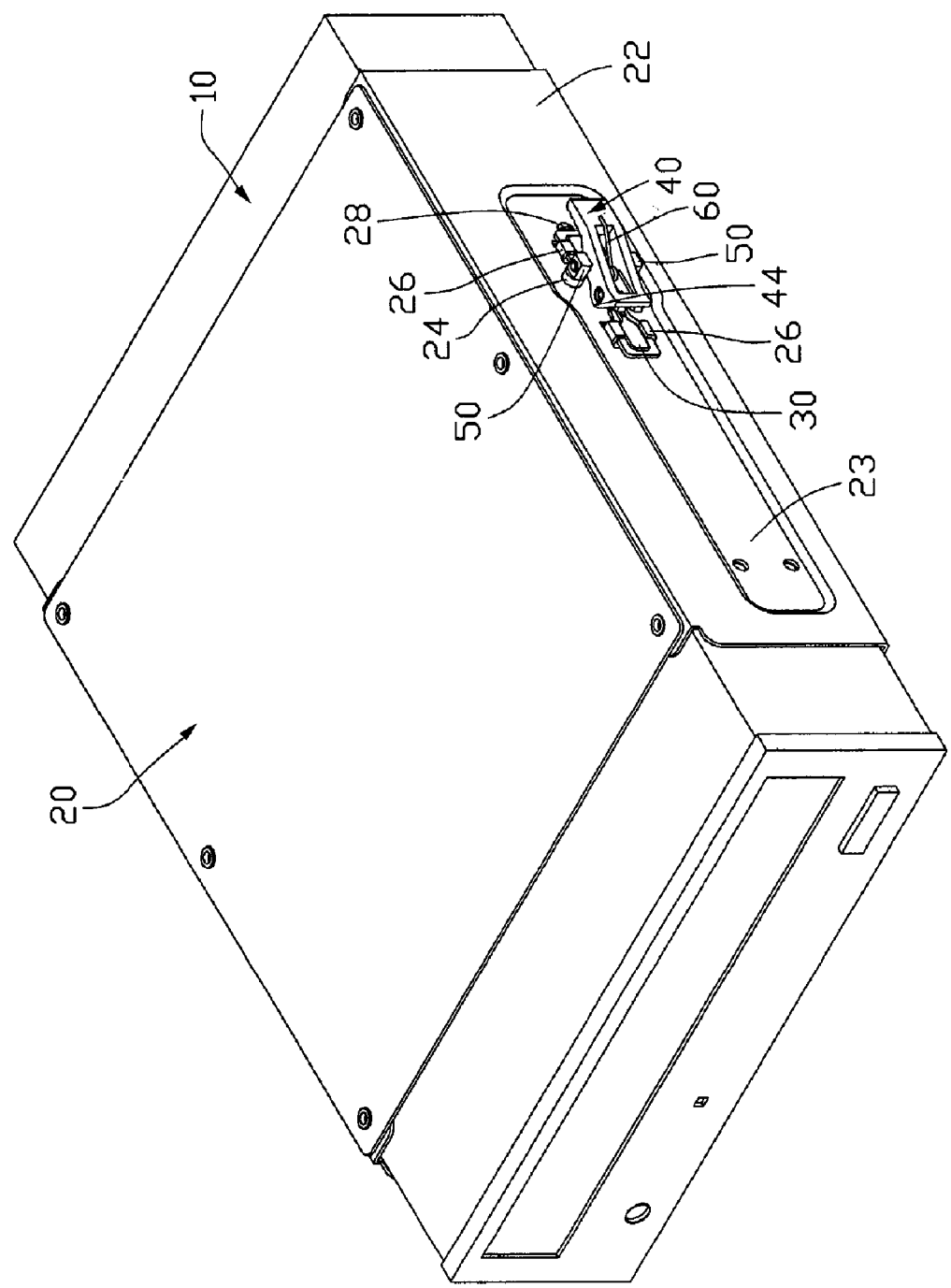
FIGS. 4 and 5 are assembled views of FIG. 1, showing two different states of the fixing apparatus.
Figure 5:
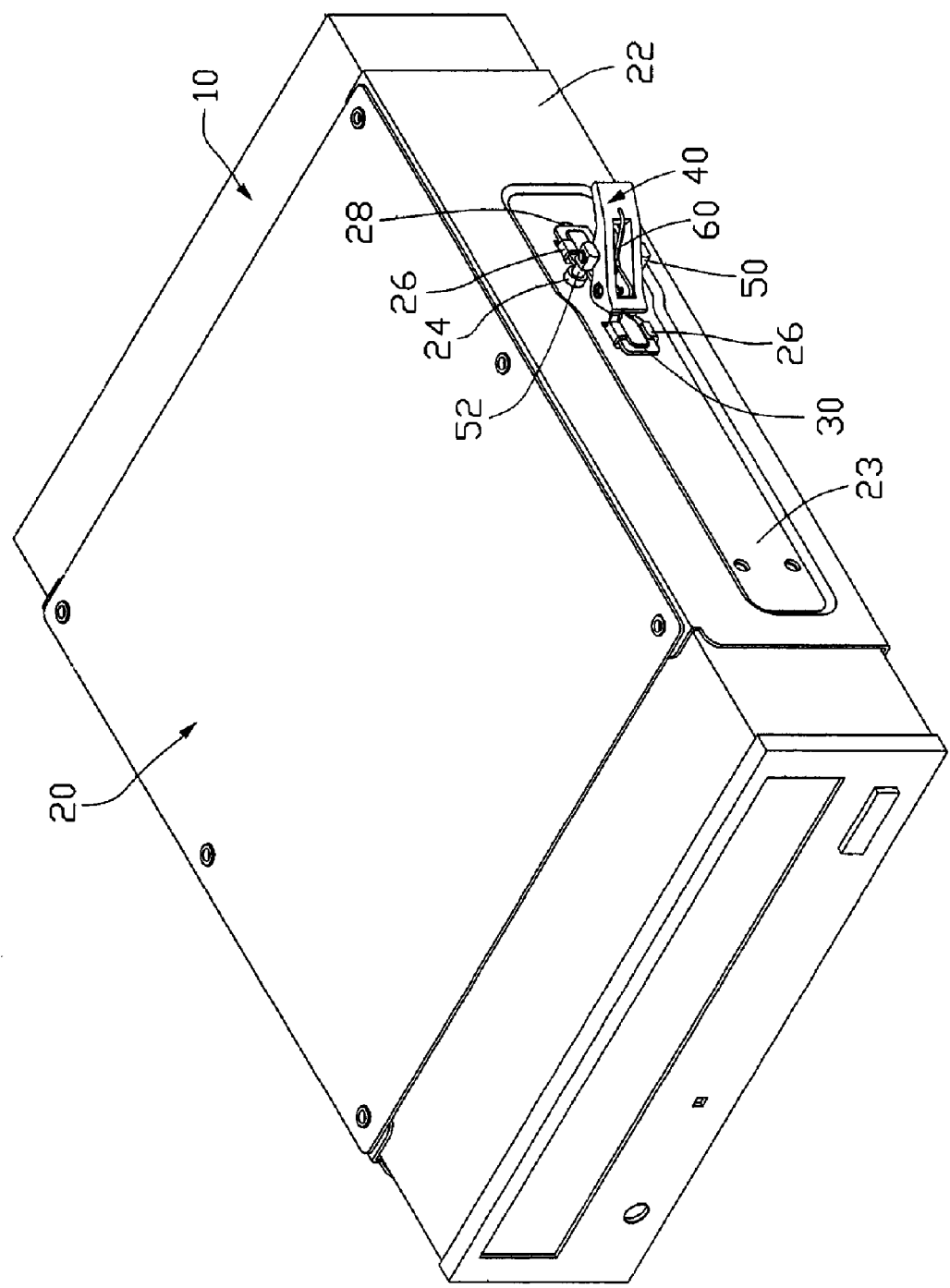

Referring also to FIGS. 4 and 5, in assembly, the sliding member 30 is attached to the rotating member 40, with the plates 34 extending into the slot 46 and abutting inside surfaces of the flanges 47. The shafts 342 are pivotably received in the pivoting holes 474, respectively. The resilient member 60 is fixed around the fixing tab 344 of the sliding member 30, with two free ends thereof abutting against the Left wing 32 of the sliding member 30 and an outside surface of the base wall 42 of the rotating member 40, respectively. The latch members 50 are pivotably attached to the rotating member 40, with the pivoting holes 542 pivotably receiving the poles 472 of the rotating member 40. The assembled sliding member 30 and the rotating member 40 are slidably attached to the side panel 22 of the bracket 20, with the hooks 26 engaging with edges of the wings 32 of the sliding member 30 and the rods 52 of the latch members 50 extending through the through holes 242 of the posts 24 of the bracket 20.

Before installation of the data storage device 10, the rotating member 40 is rotated by manipulating the handgrip portion 424 outward thereof. The resilient member 60 is squeezed and the rods 52 of the latch members 50 retract into the through holes 242 of the posts 24 of the bracket 20. The actuating ends 44 of the rotating member 40 abut against a left wing 32 of the sliding member 30 to move the sliding member 30 rightward until a free end of the right wing 32 is blocked by the blocking protrusion 28 of the bracket 20. Distal ends of the rods 52 are completely withdrawn into the through holes 242 of the posts 24. The positioning blocks 442 abut against the right wing 32 of the sliding member 30. The data storage device 10 is then inserted into the bracket 20 to a predetermined position. The rotating member 40 is released. The resilient member 60 rebounds. The rotating member 40 and the sliding member 30 move back. The rods 52 of the latch members 50 move inward and engage in the holes 12 of the data storage device 10. The data storage device 10 is thus located and fixed in the bracket 20.

In disassembly, the rotating member 40 is rotated once again to squeeze the resilient member 60. The sliding member 30 is moved rightward. The rods 52 of the latch members 50 disengage from the holes 12 of the data storage device 10. Then the data storage device 10 can be easily taken out from the bracket 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A fixing apparatus for holding a data storage device defining a pair of holes in a sidewall thereof, the fixing apparatus comprising:
    a bracket comprising a side panel, the side panel comprising a pair of posts defining a through hole therein, corresponding to the holes of the data storage device;
    a sliding member slidably attached to the side panel;
    a rotating member pivotably attached to the sliding member and moving the sliding member along the side panel, the rotating member comprising a pair of opposed poles;
    a pair of latch members, each attached to a respective pole and slidably moved along the through holes of the posts of the bracket;
    a resilient member disposed between the sliding member and the rotating member;
    wherein, in order to install the data storage device to the bracket, the rotating member is pivotably moved to a position to retract the pair of latch members into the through holes of the bracket;
    wherein, when the data storage device holes are aligned with the through holes on the bracket, the rotating member is released, and the resilient member will bias the rotating member and the sliding member back to their original position, making the pair of latch members to move into the holes to lock the data storage device with the bracket.

2. The fixing apparatus as claimed in claim 1, wherein the sliding member comprises a pair of aligned wings, the side panel of the bracket comprises two pairs of spaced hooks extending therefrom adjacent the posts, for slidably engaging with the wings.

3. The fixing apparatus as claimed in claim 2, wherein the sliding member further comprises a pair of plates perpendicular to the wings, a pair of shafts extends from the plates, the rotating member comprises a pair of flanges extending therefrom, a pair of pivoting holes is defined in the flanges to receive the shafts.

4. The fixing apparatus as claimed in claim 3, wherein the pair of poles extends from the flanges of the rotating member, each of the latch members comprises a block defining a pivoting hole to pivotably receive the corresponding pole therein.

5. The fixing apparatus as claimed in claim 4, wherein each of the latch members comprises a rod extending from the block to engage in the through holes of the posts of the bracket.

6. The fixing apparatus as claimed in claim 3, wherein the rotating member further comprises a base wall disposed between the flanges, the base wall comprises a handgrip portion, and a pair of positioning blocks formed at two opposite ends thereof.

7. The fixing apparatus as claimed in claim 3, wherein each of the flanges comprises an actuating end abutting against one of the pair of wings to move the sliding member to slide along the side panel of the bracket.

8. The fixing apparatus as claimed in claim 7, wherein the side panel of the bracket comprises a blocking protrusion extending to block another one of the pair of wings of the sliding member.

9. A fixing apparatus for holding a data storage device in a bracket, an aperture defined in the data storage device, a through hole defined in the bracket corresponding to the aperture, the fixing apparatus comprising:
    a sliding member slidably attached to the bracket;
    a rotating member pivotably attached to the sliding member to slide the sliding member on the bracket, the rotating member comprising a pole;
    a resilient member disposed between the sliding member and the rotating member;
    a latch member attached to the pole and slidably moved along the through hole of the bracket;
    wherein, in order to install the data storage device to the bracket, the rotating member is pivotably moved to a position to retract the latch member from the through hole of the bracket;
    wherein, when the data storage device apertures are aligned with the through holes on the bracket, the rotating member is released, and the resilient member will bias the rotating member and the sliding member back to their original position, making the latch member to move into the through hole and the aperture to lock the data storage device with the bracket.

10. The fixing apparatus as claimed in claim 9, wherein the sliding member comprises a plate extending therefrom, a shaft extends from the plate, the rotating member comprises a base wall, and a flange extending from the base wall, a pivoting hole is defined in the flange to receive the shaft.

11. The fixing apparatus as claimed in claim 10, wherein the pole extends from the flange of the rotating member, the latch member comprises a block defining a pivoting hole to pivotably receive the pole therein.

12. The fixing apparatus as claimed in claim 11, wherein the latch member comprises a rod extending from the block, extending through the bracket to engage with the data storage device.

13. The fixing apparatus as claimed in claim 10, wherein the flange of the rotating member has a triangular configuration and comprises an actuating end to abut against the wing of the sliding member to slide the sliding member along the bracket.

14. The fixing apparatus as claimed in claim 10, wherein the base wall of the rotating member comprises a handgrip portion and a pair of positioning blocks formed at two opposite ends thereof.

15. A fixing apparatus for holding a data storage device having at least one hole in a side wall, comprising:
- a bracket configured to receive the data storage device therein, the bracket comprising a side wall defining at least one through hole;
- a slidable member slidably attached to the side panel;
- a rotating member pivotably attached to the sliding member and moving the sliding member along the side panel, the rotating member comprising at least one pole;
- at least one latch member attached to the at least one pole and slidably moved along the at least one through hole of the bracket;
- a resilient member disposed between the sliding member and the rotating member;
- wherein, in order to install the data storage device to the bracket, the rotating member is pivotably moved to a position to retract the at least one latch members into the at least one through hole of the bracket;
- wherein, when the at least one data storage device hole is aligned with the at least one through hole of the bracket, the rotating member is released, and the resilient member will bias the rotating member and the sliding member back to their original position, making the at least one latch member to move into the at least one data storage device hole to lock the data storage device with the bracket.

16. The fixing apparatus as claimed in claim 15, wherein the resilient member is a torsion spring with two ends, one end of the spring abutting against an end portion of the rotating member and the other end of the spring abutting against the sliding member.

17. The fixing apparatus as claimed in claim 15, wherein the rotating member comprises a pair of spaced flanges, the sliding member comprises a pair of plates located between the pair of spaced flanges, a pair of post/hole combination being respectively formed between the plates and the flanges for pivotably connecting the rotating member to the sliding member.

* * * * *